Figure 1:
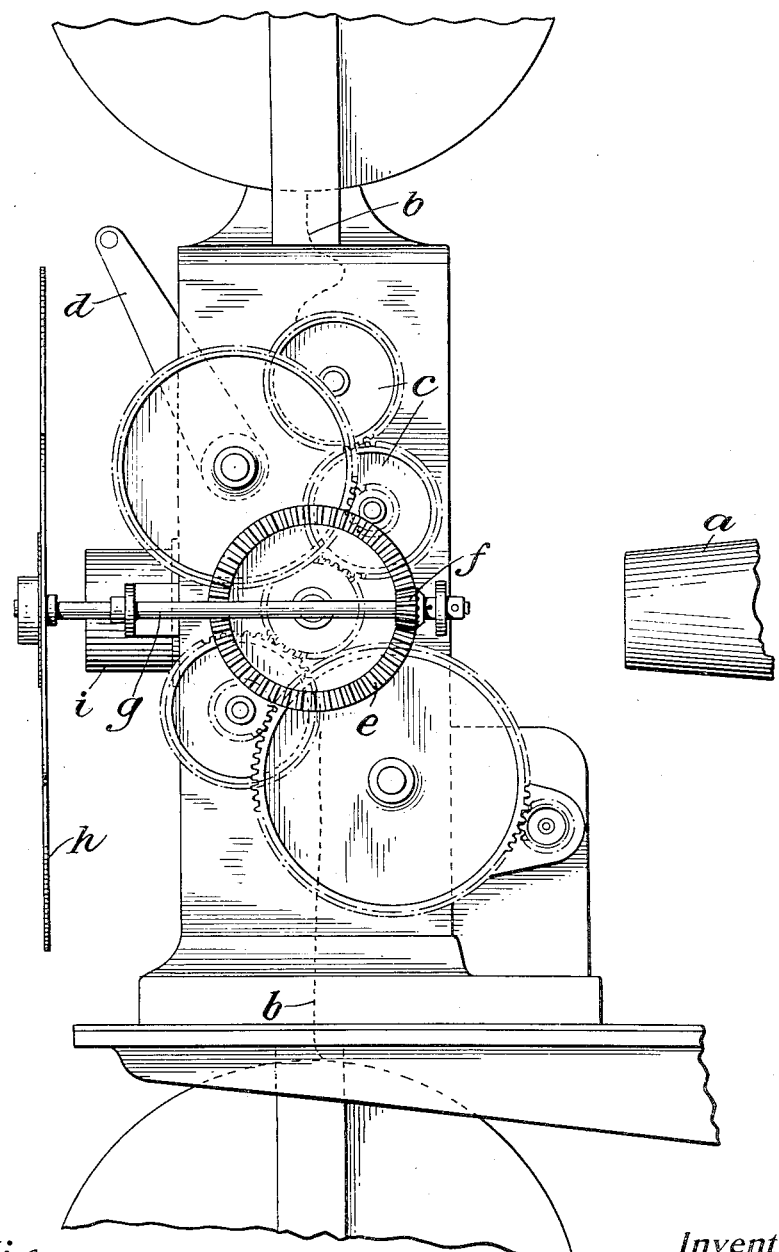

E. M. WOODEN.
MOVING PICTURE MACHINE.
APPLICATION FILED FEB. 11, 1914.

1,123,456.

Patented Jan. 5, 1915.
2 SHEETS—SHEET 1.

E. M. WOODEN.
MOVING PICTURE MACHINE.
APPLICATION FILED FEB. 11, 1914.

1,123,456.

Patented Jan. 5, 1915.

2 SHEETS—SHEET 2.

Attest:

Inventor:

UNITED STATES PATENT OFFICE.

EARLE M. WOODEN, OF NEW YORK, N. Y., ASSIGNOR OF ONE-HALF TO ANTHONY B. CAVANAGH, OF NEW YORK, N. Y.

MOVING-PICTURE MACHINE.

1,123,456.  Specification of Letters Patent.  Patented Jan. 5, 1915.

Application filed February 11, 1914. Serial No. 817,953.

*To all whom it may concern:*

Be it known that I, EARLE M. WOODEN, a citizen of the United States, and a resident of the borough of Manhattan of the city of New York, in the State of New York, have invented certain new and useful Improvements in Moving-Picture Machines, of which the following is a specification, reference being had to the accompanying drawings, forming a part hereof.

This invention relates to moving picture machines and has for its principal object to provide means whereby the flickering or variation of light on the screen is minimized.

One practical embodiment of the invention is illustrated in the accompanying drawings, although it will be evident as this description proceeds that a different disposition of the source of light whereby the flickering effect is reduced may be employed and the construction of the shutter may be altered without departing from the spirit of the invention.

It has formerly been the general practice to provide a shutter adapted to cut off from the screen the main source of light during the brief interval while one picture on the film is being moved forward and the next succeeding picture is being brought into proper position to be projected upon the screen. The result of this arrangement is, of course, alternate periods of absolute darkness and illumination on the screen and the effect on the eye, the flickering effect above referred to. To minimize this flickering it is proposed in accordance with the present invention to provide a shutter which, while cutting off from the screen either the entire image of the pictures being changed or a portion thereof, shall at all times permit beams of light, preferably from the principal source of light, to fall on the screen, so that there is never a period of absolute darkness, the changing degrees of illumination being within such narrow limits as to be unappreciable to the eye. It has been found in practice that when most of the image is cut off the remaining portion does not appear distinctly but leaves on the screen merely a diffused light of less intensity than would be the case if the entire projecting beam fell thereon without interference. The theory of the invention depends primarily on the well known physical composition of shadows into the two zones commonly termed the umbra and the penumbra. In the present invention, the zone of light remaining on the screen during the time that the image of the picture or a portion thereof is cut off by the shutter corresponds to the penumbra of a shadow, while the beam of light interrupted by the shutter at this time leaves on the screen, in theory, the umbra of the shadow. In practice, of course, these zones cannot be distinguished by the eye, but a reference to them will serve to illustrate the changing degrees of illumination which are produced on the screen by the use of the shutter hereinafter particularly described and the relationship thereof to the other parts of the machine.

The invention will be described more particularly with reference to the accompanying drawings, in which—

Figure 2:
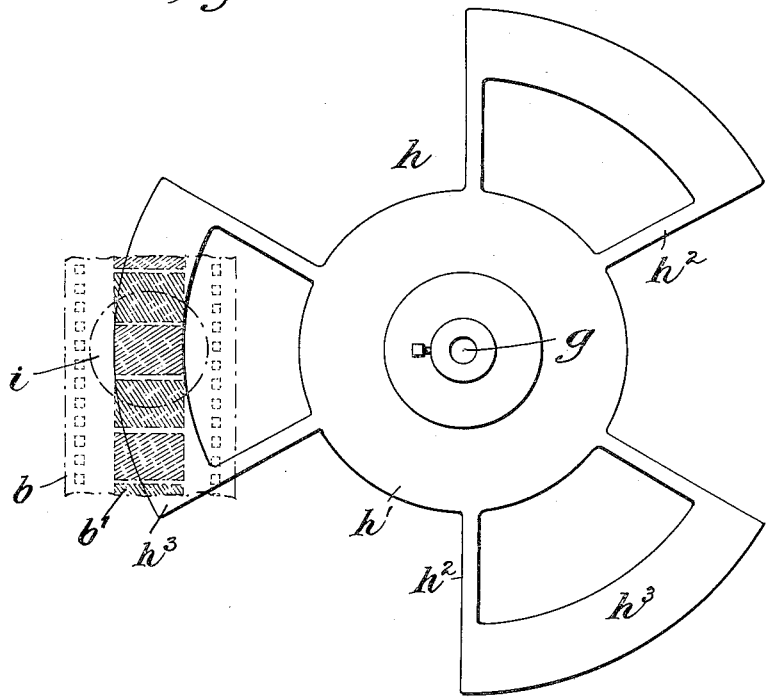
Figure 3:
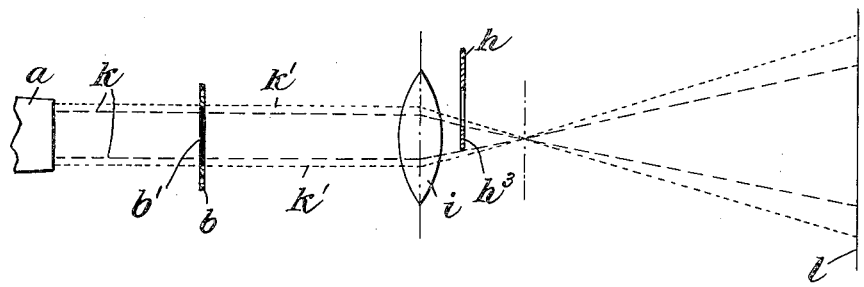

Figure 1 is a fragmentary view in side elevation of so much of a moving picture machine as is necessary for a clear understanding of the invention, showing particularly the position of the shutter with respect to the projecting lens and the film. Fig. 2 is a view in elevation of one form of the improved shutter and showing particularly its relationship to the projecting lens and the pictures on the film. Fig. 3 is a diagrammatic view of the paths of certain of the rays of light from the main source of light, this main source of light being indicated together with the film, the projecting lens, the shutter and the screen.

For the purposes of this description, it will be assumed that a suitable source of light is provided in such position that its rays are collected and pass through a lens located at *a* which is positioned directly behind and in proper relationship to the film *b* and its operating mechanism, indicated generally by the train of gears *c* operable by means of the crank *d*. One of the actuating spools of the film *b* may carry on one end of its shaft a bevel gear *e* in mesh with a bevel pinion *f* which is carried on a shaft *g* extending horizontally along the side of the film supporting devices and carrying adjacent its forward end a rotary shutter *h* of the form hereinafter described. By the mechanism just described it will be understood that the movement of the film is properly synchronized with respect to the rotary movement of the shutter, the result being that the shutter is interposed between the image of the picture or a portion thereof and the screen while one picture is being moved out of its projecting position and replaced by the next succeeding picture to be shown, and is moved out of the path of the projected image to permit the image to appear on the screen at the instant the picture on the film is in the proper position to be projected. As usual, a projecting lens $i$ is mounted in line with the collecting lens at $a$ and the picture to be shown in such a manner that the image of the picture as it appears on the screen, shall be magnified and distinct. It is the usual practice to employ a convex or converging projecting lens, and this invention is described on the assumption that such a lens is actually employed, as will appear from Fig. 3. The beam of light, while, of course, controlled by the shutter $h$, is not concentric with the supporting shaft $g$ of said shutter, but the said shaft is off-set with respect to the lens and extends parallel with the axis thereof, so that only a portion of the shutter is effective to close the lens $i$, as will appear more particularly hereinafter when the specific form of the shutter $h$ is pointed out.

In realizing the invention in accordance with the illustrated embodiment it is proposed to take advantage of the main source of light of the machine for the purpose of keeping the screen partially illuminated during the time the shutter is in position to cut off the image on the screen, although it will be evident that an independent source of light, properly controlled, will accomplish the desired result. Accordingly, it becomes possible to employ a single shutter for the purpose of cutting off the image or a portion thereof in the manner described and, at the same time, permitting the main source of light to shed certain of its rays on the screen at all times. As shown in Fig. 2, the shutter $h$, while generally of the same outline as the well known three-wing shutter, is formed with a main body portion $h'$ and radial ribs $h^2$ extending outwardly therefrom and carrying arcuate segments $h^3$ concentrically arranged with respect to the supporting shaft $g$ of the shutter. As will be understood this shutter may be stamped from a single piece of metal. The concentric segments $h^3$ are spaced from each other at such distances as may be found desirable in view of the speed at which the film is designed to be operated and the gear ratio between the supporting shaft $g$ of the shutter and the actuating spools for the film. It will be observed further from Fig. 2 that the pictures indicated generally by the shaded portions $b'$ of the film $b$ are of a width less than the diameter of the projecting lens $i$, indicated generally by the broken line in said figure. The width of the segments $h^3$ of the shutter $h$, measured radially, may be equal to or less than the width of the image of the pictures $b'$ on the film $b$ at the place where the shutter is positioned, so that when one of the segments $h^3$ is in position to cut off the image of one of said pictures $b'$ or a portion thereof from the screen, certain of the rays from the main source of light will be permitted to pass the said segment $h^3$ to fall on the exhibiting screen and keep the same partially illuminated while the next succeeding picture is being moved into its projecting position and the effect on the screen will be a diffused light whether the entire image or only a portion thereof is cut off, that portion which is not cut off not being discernible. For convenience in this description and the claims, the expression "cut off" as applied to the image means that either part of the image is cut off (as shown in the drawings) or that all of it is cut off, the effect in either case being a realization of the invention in that a diffused light is thrown on the screen, while all of the distinct images, in so far as they can be seen by the naked eye, are cut off.

In Fig. 3 the theoretical arrangement of the paths of certain of the rays from the main source of light with reference to the pictures on the film, the lens, the shutter and the screen, is clearly shown. The projecting beam, as defined by the dotted lines $k$, $k'$, serves to throw the image of the picture $b'$ on to the screen, indicated generally by the reference character $l$, after the said beam has passed through the projecting lens $i$ and the image of the picture has been inverted in a manner which will be understood. What might be termed the marginal portion of the projecting beam, defined by the lines $k$, $k'$, serves to illuminate the screen $l$ theoretically to the extent indicated, although this portion of the beam is diffused and does not throw any distinct images on the screen when the shutter is closed whether said portion passes through the picture or on the sides thereof. When the shutter $h$ has one of its segments $h^3$ moved into position to cut off the image of the picture $b'$ to permit the next succeeding picture to be moved into projecting position, the screen $l$ is illuminated solely by the so-called marginal portion of the beam of light defined by the lines $k$, $k'$. The result is that the screen is never left in absolute darkness and a mere changing degree of the intensity of the light is necessitated by the interposition of the shutter $h$. By reason of the comparatively high rate of speed at which the film travels and the correspondingly high speed of rotation of the shutter $h$, this changing degree of illumination of the screen is unappreciable to the naked eye and the injurious flickering commonly present in moving picture exhibitions is eliminated.

While it will be evident that the present invention is not concerned directly with the position of the shutter $h$ with respect to the projecting lens $i$, it might be pointed out that, of necessity, the shutter is mounted near the focal point of said lens in order that the segments $h^3$ may not cut off the image of the picture $b'$ at a place where said image is comparatively small. Since the rays of light converge immediately after leaving a convex projecting lens, such a place will be found inside of the focal point of the projecting lens and at a little distance in front of the lens, as indicated generally in Figs. 1 and 3.

As noted before, it will be evident that other forms of shutters may be employed in practising the present invention and the relative positions and arrangement of the projecting light, film, lens and shutter altered, without departing from the spirit of the invention.

I claim as my invention:

1. In a moving picture machine, means to project a beam of light, means to cut off certain rays of the beam periodically from the screen, certain other rays being interrupted by said second named means and serving to illuminate the screen at all times.

2. In a moving picture machine, means to project a beam of light, means to cut off certain rays of the beam periodically from the screen, said second named means permitting the free passage of other of said rays to illuminate the screen at all times.

3. In a moving picture machine, means to project a beam of light, a shutter to cut off from the screen periodically the images of the pictures on the film, said shutter permitting the direct passage of rays from the source of light past it at such times to keep the screen constantly illuminated.

4. In a moving picture machine, the combination with the projecting lens, of a shutter mounted operatively with respect to said lens to cut off periodically from the screen the images of the pictures on the film, the effective area of the shutter being less than that of the beam of light and the area of the lens being greater than that of the pictures to be projected, the pictures, lens and shutter being so mounted with respect to each other as to permit rays of the main source of light to pass by the shutter and illuminate the screen at all times.

5. In a moving picture machine, the combination with the projecting lens, of a shutter mounted operatively with respect to said lens and near the focal point thereof to cut off periodically from the screen the images of the pictures on the film, the effective area of the shutter being less than that of the lens and the area of the lens being greater than that of the pictures to be projected, the pictures, lens and shutter being so mounted with respect to each other as to permit rays of light from the main source of light to pass by the shutter and illuminate the screen at all times.

6. In a moving picture machine, the combination with the projecting lens, of a rotatable shutter mounted operatively with respect thereto, and means to connect operatively the shutter and the film operating mechanism to synchronize their movements, said shutter comprising a plurality of independent segments movable successively across the axis of the lens to cut off the images of the pictures from the screen, said segments being radially of a width less than the diameter of the beam of light, whereby rays from the source of light may pass at the side thereof and illuminate the screen at all times.

This specification signed and witnessed this ninth day of February, A. D. 1914.

EARLE M. WOODEN.

Signed in the presence of—
E. M. TAYLOR,
WORTHINGTON CAMPBELL.